(12) United States Patent
Griess et al.

(10) Patent No.: US 7,861,970 B2
(45) Date of Patent: Jan. 4, 2011

(54) FUSELAGE STRUCTURE INCLUDING AN INTEGRATED FUSELAGE STANCHION

(75) Inventors: Kenneth H. Griess, Kent, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 367 days.

(21) Appl. No.: 11/842,414

(22) Filed: Aug. 21, 2007

(65) Prior Publication Data

US 2009/0294588 A1    Dec. 3, 2009

Related U.S. Application Data

(63) Continuation-in-part of application No. 11/555,829, filed on Nov. 2, 2006.

(51) Int. Cl.
*B64C 1/00* (2006.01)

(52) U.S. Cl. ........................................ 244/120; 244/119

(58) Field of Classification Search .............. 244/118.1, 244/119, 120, 117 R, 131, 118.5, 118.6; 428/113, 428/119, 105
See application file for complete search history.

(56) References Cited

U.S. PATENT DOCUMENTS

| 1,563,077 | A | * | 11/1925 | Danforth | ...................... 52/634 |
| 2,233,969 | A | * | 3/1941 | Woods | ..................... 244/123.8 |
| 3,612,316 | A | * | 10/1971 | Baldwin et al. | ............. 414/499 |
| 4,593,870 | A | * | 6/1986 | Cronkhite et al. | ........ 244/117 R |
| 4,674,712 | A | * | 6/1987 | Whitener et al. | ............ 244/119 |
| 4,734,146 | A | * | 3/1988 | Halcomb et al. | ............. 156/148 |
| 5,086,996 | A | * | 2/1992 | Roeder et al. | ................ 244/119 |
| 6,510,961 | B1 | * | 1/2003 | Head et al. | ................... 220/645 |
| 6,834,833 | B2 | * | 12/2004 | Sankrithi | ..................... 244/119 |
| 6,948,684 | B2 | * | 9/2005 | Beral et al. | .................. 244/119 |
| 7,182,291 | B2 | * | 2/2007 | Westre et al. | ............... 244/119 |
| 7,261,257 | B2 | * | 8/2007 | Helou, Jr. | ................. 244/137.1 |
| 7,555,873 | B2 | * | 7/2009 | Kilwin et al. | .................. 52/838 |
| 2004/0040252 | A1 | * | 3/2004 | Beral et al. | ................. 52/729.3 |
| 2006/0231681 | A1 | * | 10/2006 | Huber et al. | ................. 244/119 |
| 2007/0095982 | A1 | * | 5/2007 | Kismarton et al. | .......... 244/119 |
| 2007/0272798 | A1 | * | 11/2007 | Jamgarov et al. | ........... 244/119 |

FOREIGN PATENT DOCUMENTS

| WO | 199715492 | 5/1997 |
| WO | 2007057411 | 5/2007 |

OTHER PUBLICATIONS

UK Intellectual Property Office, Combined Search and Examination Report under Sections 17 and 18(3), for United Kingdom Patent Application No. GB0721312.7, dated Feb. 13, 2008.

\* cited by examiner

*Primary Examiner*—Joshua J Michener
(74) *Attorney, Agent, or Firm*—Charles I. Moore; Moore & Van Allen PLLC

(57) ABSTRACT

A fuselage structure for an aircraft or similar vehicle may include an upper fuselage portion and a lower fuselage portion. A floor may be disposed between the upper fuselage portion and the lower fuselage portion. At least one unitized stanchion may be disposed between the floor and the lower fuselage portion. The at least one unitized stanchion may form the only structural support between the floor and the lower fuselage portion without any vertical beams.

31 Claims, 12 Drawing Sheets

US 7,861,970 B2

FUSELAGE STRUCTURE INCLUDING AN INTEGRATED FUSELAGE STANCHION

CROSS REFERENCE TO RELATED APPLICATIONS

This application is a Continuation-In-Part of U.S. patent application Ser. No. 11/555,829, filed Nov. 2, 2006, entitled "Optimized Fuselage Structure" and naming Kenneth H. Griess et al., as the inventors. The content of this application is incorporated herein by reference in its entirety, and the benefit of the filing date of this application is hereby claimed for all purposes that are legally served by such claim for the benefit of the filing date.

BACKGROUND OF THE INVENTION

The present invention relates to aircraft, aerospace vehicles or the like and more particularly to an optimized fuselage structure for an aircraft or aerospace vehicle.

Large aircraft fuselages are structurally designed to endure the effects of vehicle maneuvers in the air and on the ground. The altitude of vehicle flight requires that internal fuselage pressure is maintained at levels comfortable to pilots and passengers. Because of the combination of these loads, traditional aircraft fuselages have structures which include multiple stringer, longerons and other structural members covered by a skin. These components are typically manufactured from a metal, such as aluminum, an aluminum alloy or other high strength to weight metal. These structures are also complex to manufacture, assemble and inspect.

FIG. 1A is a perspective view of prior art fuselage structure 100 including a complex internal framework 102 covered by a skin 104. The internal framework 102 includes a multiplicity of frames 106 and longerons/stringers 108. A plurality of floor joists 110 or floor beams may extend between opposite sides of the fuselage structure 100 and may be attached to the stringers 108 on opposite sides of the fuselage structure 100. The plurality of joists 110 or floor beams provides support for a floor for a passenger compartment or an upper cargo compartment. A vertical beam 112 may be attached to each of the floor joists 110 to provide additional structural support. As illustrated in FIG. 1B, a stanchion panel 114 may be attached along vertical beams 112. The stanchion panels 114 may provide a cargo barrier for a lower cargo compartment and may also form a fire barrier depending upon the material from which the stanchion panel 114 is formed. As illustrated in FIGS. 1A and 1B, this structure includes multiple components and is complex to manufacture, assemble, and inspect.

BRIEF SUMMARY OF THE INVENTION

In accordance with an embodiment of the present invention, a fuselage structure for an aircraft or similar vehicle may include an upper fuselage portion and a lower fuselage portion. A floor may be disposed between the upper fuselage portion and the lower fuselage portion. At least one unitized stanchion may be disposed between the floor and the lower fuselage portion. The at least one unitized stanchion may form the only structural support between the floor and the lower fuselage portion without any vertical beams.

In accordance with another embodiment of the present invention, an aircraft may include a fuselage. The fuselage may include an upper fuselage portion and a lower fuselage portion. A floor may be disposed between the upper fuselage portion and the lower fuselage portion. At least one unitized stanchion may be disposed between the floor and the lower fuselage portion, wherein the at least one unitized stanchion may form the only structural support between the floor and the lower fuselage portion without any vertical beams.

In accordance with another embodiment of the present invention, a method for making a fuselage structure may include forming an upper fuselage portion and a lower fuselage portion. The method may also include disposing a floor between the upper fuselage portion and the lower fuselage portion. The method may further include disposing at least one unitized stanchion between the floor and the lower fuselage portion, wherein the at least one unitized stanchion may form the only structural support between the floor and the lower fuselage portion without any vertical beams.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 2A:
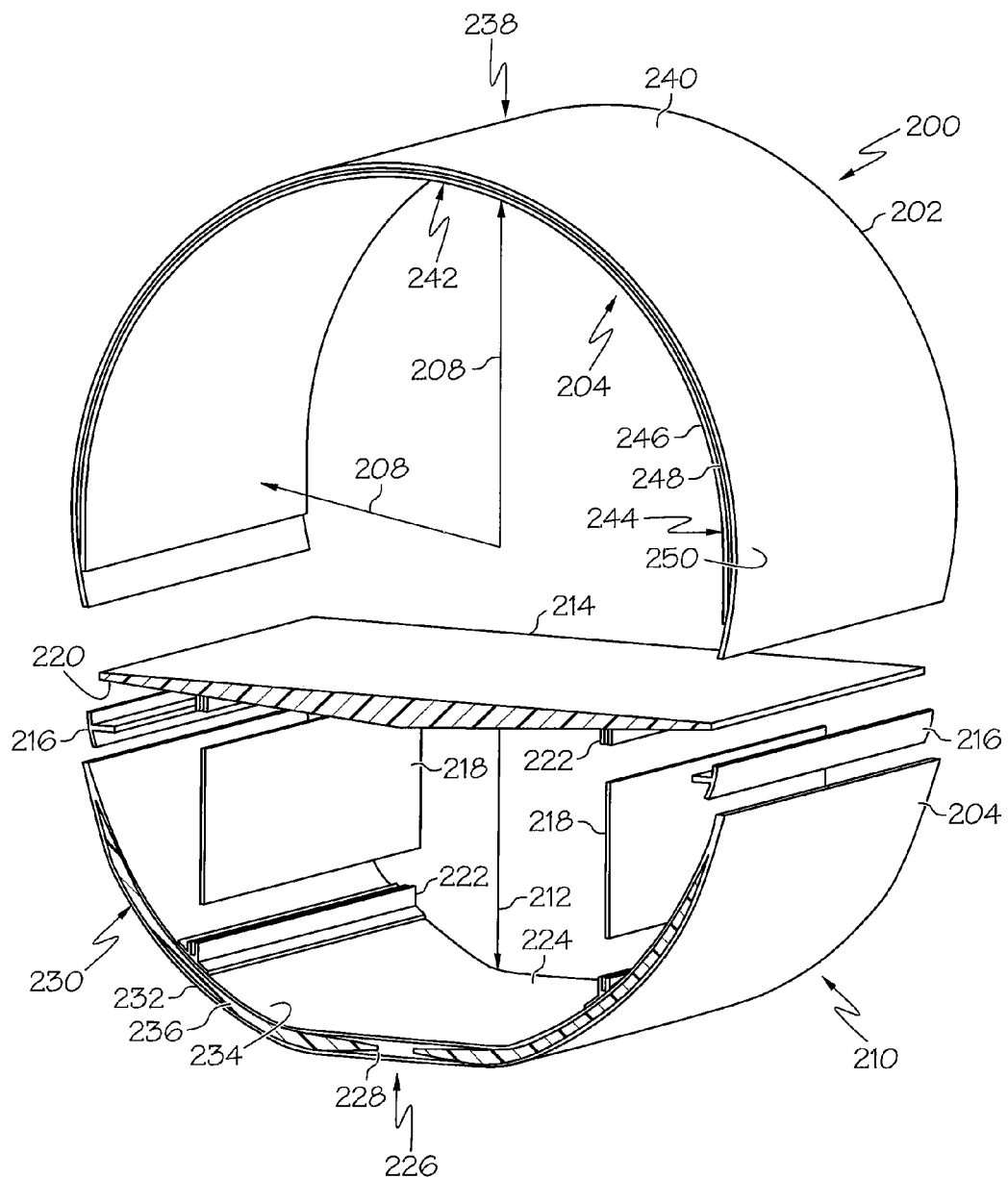
FIG. 2A is an exploded perspective view of an optimized fuselage structure for an aerospace vehicle in accordance with an embodiment of the present invention.

FIG. 2A is an exploded perspective view of an optimized fuselage structure 200 for an aircraft or aerospace vehicle in accordance with an embodiment of the present invention. The fuselage structure 200 may include an upper fuselage portion 202 and a lower fuselage portion 204. The upper fuselage portion 202 may include a first, non-circular cross section 206 defined by a first set of varying radii of curvature 208 similar to that described in U.S. patent application Ser. No. 11/555,829. The lower fuselage portion 204 may also include a second, non-circular cross-section 210 defined by a second set of varying radii of curvature 212 similar to that also described in U.S. patent application Ser. No. 11/555,829.

The upper fuselage portion 202 and the lower fuselage portion 204 may be formed as separate fuselage pieces or members. Forming the upper fuselage portion 202 and lower fuselage portion 204 as separate pieces may permit elimination of separate pre-cured structural details, such as frames and other components, and may allow one piece tooling. Forming as separate pieces or members may also enable greater assembly flexibility.

Figure 1A:
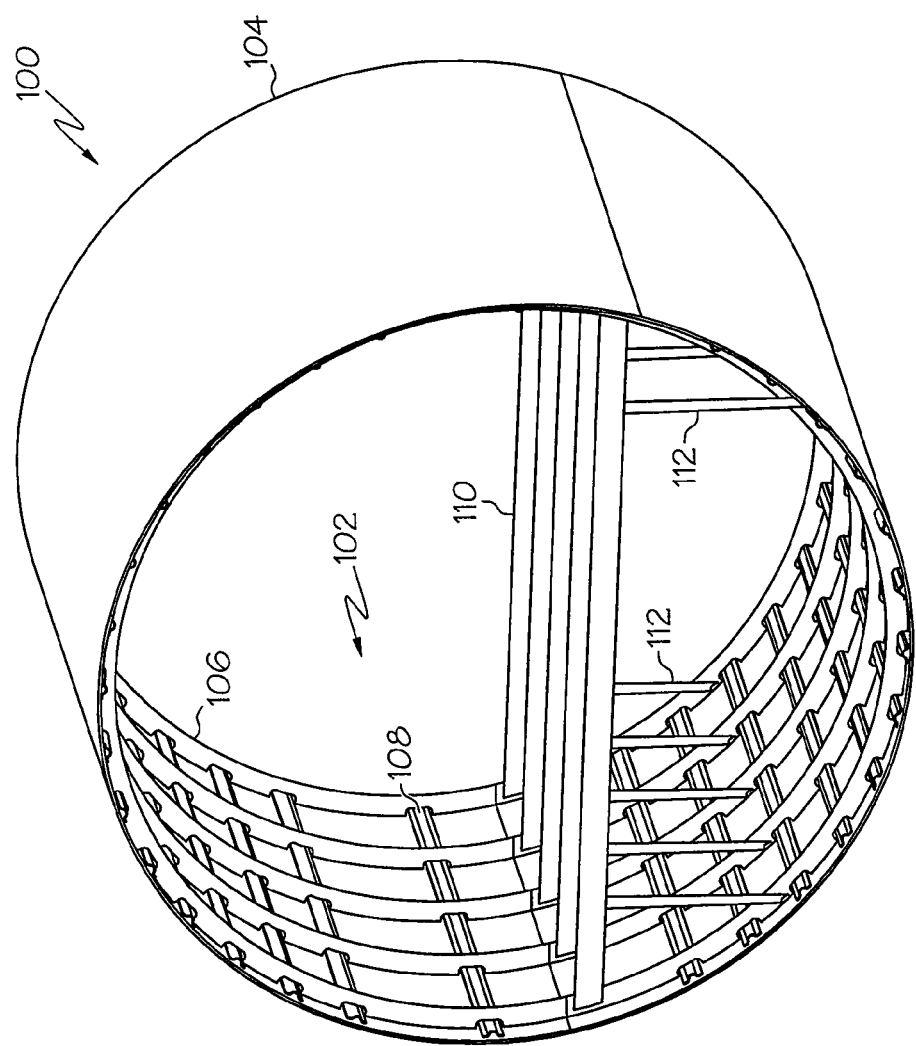
FIG. 1A is a perspective view of prior art fuselage structure including a complex internal framework covered by a skin.

The fuselage structure 200 may also include a unitized one-piece passenger floor 214 disposed substantially between the upper fuselage portion 202 and the lower fuselage portion 204. The fuselage structure 200 may also include floor attachment longerons 216 or similar members to attach the one-piece passenger floor 214 on either side to at least one of the upper fuselage portion 202 and the lower fuselage portion 204 when the fuselage structure 200 is assembled. The unitized one-piece passenger floor 214 and the floor attachment longerons 216 may be formed from a composite material and may be bonded or attached to one another and to at least one of the upper fuselage portion 202 and the lower fuselage portion 204. The floor attachment longerons 216 may also be a joining element forming a combination floor attach and fuselage lap splice fitting to join the upper fuselage portion 202 and the lower fuselage portion 204 and the unitized passenger floor 214. The joining element 216 may be a one-piece or a single element to join each of the passenger floor 214 and the upper and lower fuselage portions 202 and 204. The unitized one-piece passenger floor 214 constitutes a much simpler structure compared to the plurality of floor joists 110 of FIG. 1A for supporting a floor panel disposed on the floor joists 110.

The fuselage structure 200 may also include a unitized stanchion 218 or integrated stanchion that may be disposed between an underside 220 of the passenger floor 214 and the lower fuselage portion 204. A unitized stanchion is one that performs the multiple functions of a singular stanchions and a cargo liner combined in one integrated element. The unitized stanchion 218 may also define a cargo wall or barrier. A pair of unitized stanchions 218 may be disposed at a predetermined distance from one another proximate to respective lateral sides of the fuselage structure 200 to define a cargo compartment along with a cargo floor 224 as described below. The unitized stanchion 218 may also include a structure and materials to provide a fire barrier.

Figure 2B:
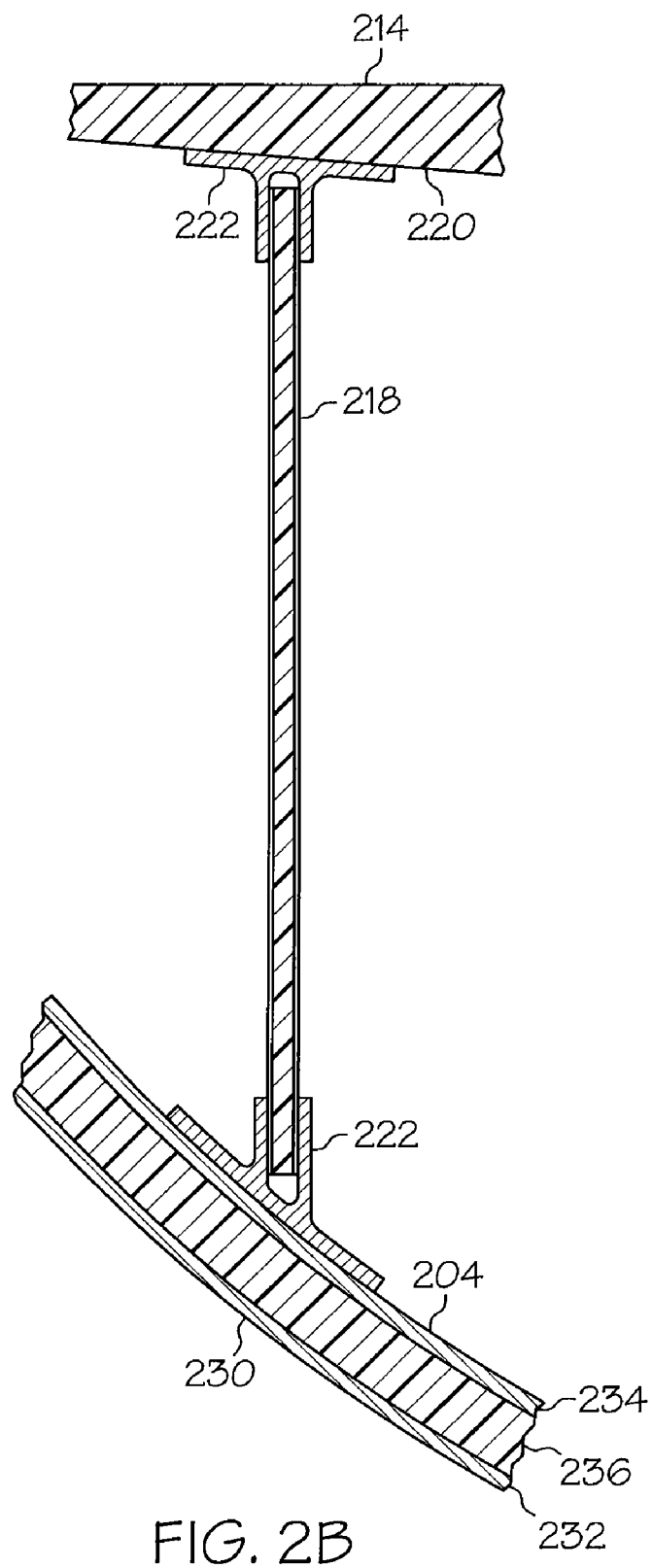
FIG. 2B is a detailed cross-sectional view of an example of a unitized stanchion in accordance with an embodiment of the present invention.

Referring also to FIG. 2B, FIG. 2B is a detailed cross-sectional view of an example of the unitized stanchion 218 in accordance with an embodiment of the present invention. The unitized stanchion 218 may each be a composite sandwich structure as will be described in more detail herein and may be respectively attached to the underside 220 of the passenger floor 214 and to the lower fuselage portion 204 by suitable longeron pi-type joints 222, a pi clip attachment or similar attachment members. The pi-type joints 222 may be made from a composite material or metal material, such as metallic titanium.

Figure 1B:
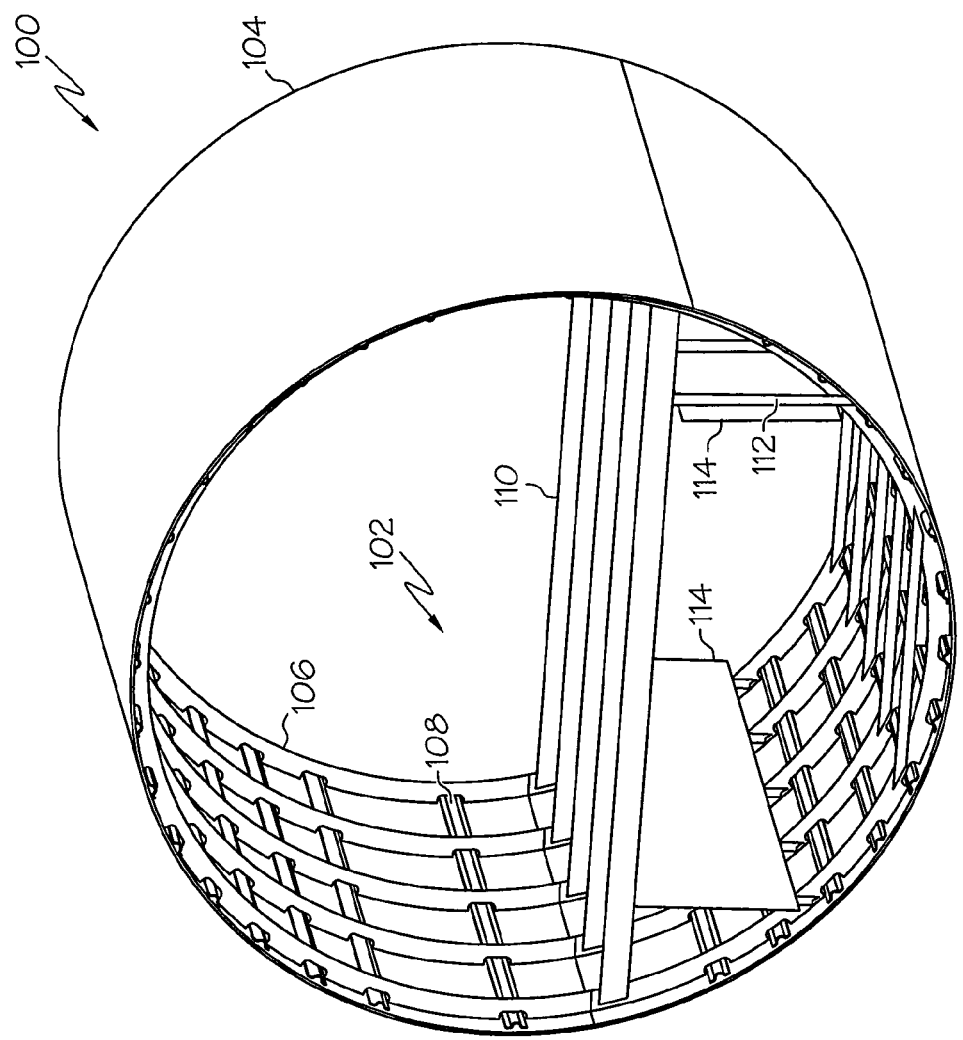
FIG. 1B is a perspective view of the prior art fuselage structure of FIG. 1A including a stanchion panel attached along vertical beams.

The application of composite materials has increased the fatigue resistance and crack sensitivity over commonplace aluminum structures. Instead of building the structure from supplied sheet and extrusion forms, composite structures are formed from materials, such as fiber forms and resin. Given the improved material properties and the added fabrication control, opportunities to unitize and simplify the structure compared to prior art structures are available. The manufacturing and structural efficiency gained through a core type structure (or sandwich construction) as described herein enable low cost solutions to the multi-piece built-up structure that was required for traditional metallic structures. The unitized stanchion design can also distribute loads along its entire length, rather than individual points, such as vertical beams 112 in FIGS. 1A and 1B. The unitized stanchion can substantially absorb an impact and better control failure.

Additionally, in manufacturing, making one part is often easier than many. Making a core structure is often easier than laminate parts on complicated tooling which is typical for individual designs. The unitized stanchion can be made flat on flat tooling. The individual typically has a section shape ("I" or "H") with complex tooling. Further, installation of one big part is typically easier than many small parts. The unitized stanchion permits a better opportunity to utilize bonding rather than the added labor and weight of fastening.

The fuselage structure 200 in FIG. 2A may also include a unitized or integrated cargo floor 224 defined by or integrated into a substantially flattened bottom or base section 226 of the lower fuselage portion 204. The integrated cargo floor 224 enables a flattened keel with a core structure as described in more detail herein. The fuselage shell or structure 200 also defining the cargo floor structure 224 simplifies construction and provides a more efficient use of materials. The substantially flattened bottom or base section 226 provides additional aircraft rotational clearance for take-off and landing compared to a conventional substantially circular cross-sectional fuselage. The additional aircraft rotational clearance may permit the use of shorter landing gear and present a lighter overall structural weight. The substantially flattened bottom section 226 may also generate lift under some circumstances. The reduced circumference also creates less wetted surface relative to a round or circular surface for a given configuration. The less the wetted surface, the less the aerodynamic drag.

The fuselage structure 200 may further include an integrated keel beam 228 formed in the lower fuselage portion 204. Examples of integrated keel beam structures that may be used for the integrated keel beam 228 will be described in more detail with reference to FIGS. 6, 7 and 8.

The upper fuselage portion 202 and the lower fuselage portion may be formed from a sandwich structure 230. The sandwich structure 230 may include an outer layer of material 232 and an inner layer of material 234. The outer layer 232 and inner layer 234 may be a composite material or other fabric, metallic material, a combination thereof or other type material suitable for such applications. A core structure 236 may be disposed between the outer layer 232 and inner layer 234. The core structure 236 may be a honeycomb type structure, a foam type material structure, a metallic material structure or other lightweight, high strength material structure.

In accordance with an embodiment of present invention, the fuselage structure 200 may include a hybrid solution or structure and that may include a combination of solid laminate in some locations and a core structure in others. For example, an upper section 238 or crown structure of the upper fuselage portion 202 may have a thicker skin 240 relative to other portions of the fuselage to avoid impact damage, such as from hail when the aircraft is on the ground or lower altitudes, or for other purposes or criteria. Additionally, given that this upper section 238 area may be dominated by tension and low compression, the skin 240 may have a predetermined thickness to provide sufficient stabilization or stiffening to prevent any buckling by the skin 240 alone with a core structure not necessarily being needed. The skin 240 may be formed from a solid laminate structure 242 or the like. The upper fuselage section 202 may then include the solid laminate type structure 242 or skin 240 proximate to the upper section 238 and then transition in a lower section 244 with a sandwich type structure similar to structure 230 with an inner layer 246, core structure 248 and outer layer 250. The inner layer 246 and the outer layer 250 may be integrally formed with inner and outer segments of the solid laminate structure 242. The core structure 248 may be thickest in the lower section 244 and taper in toward the upper section 238. The skin 240 may have an inverse relationship becoming thinner in the lower section 244 relative to the upper section 238 of the upper fuselage portion 202 with more of the structure being core 248 in the lower section 244.

While the fuselage structure 200 of the present invention has been described as including an upper fuselage portion 202 and a lower fuselage portion 204, the fuselage structure 200 could be formed of any number of different portions or may be formed as a single integrated piece as described with reference to FIG. 10.

Figure 2C:
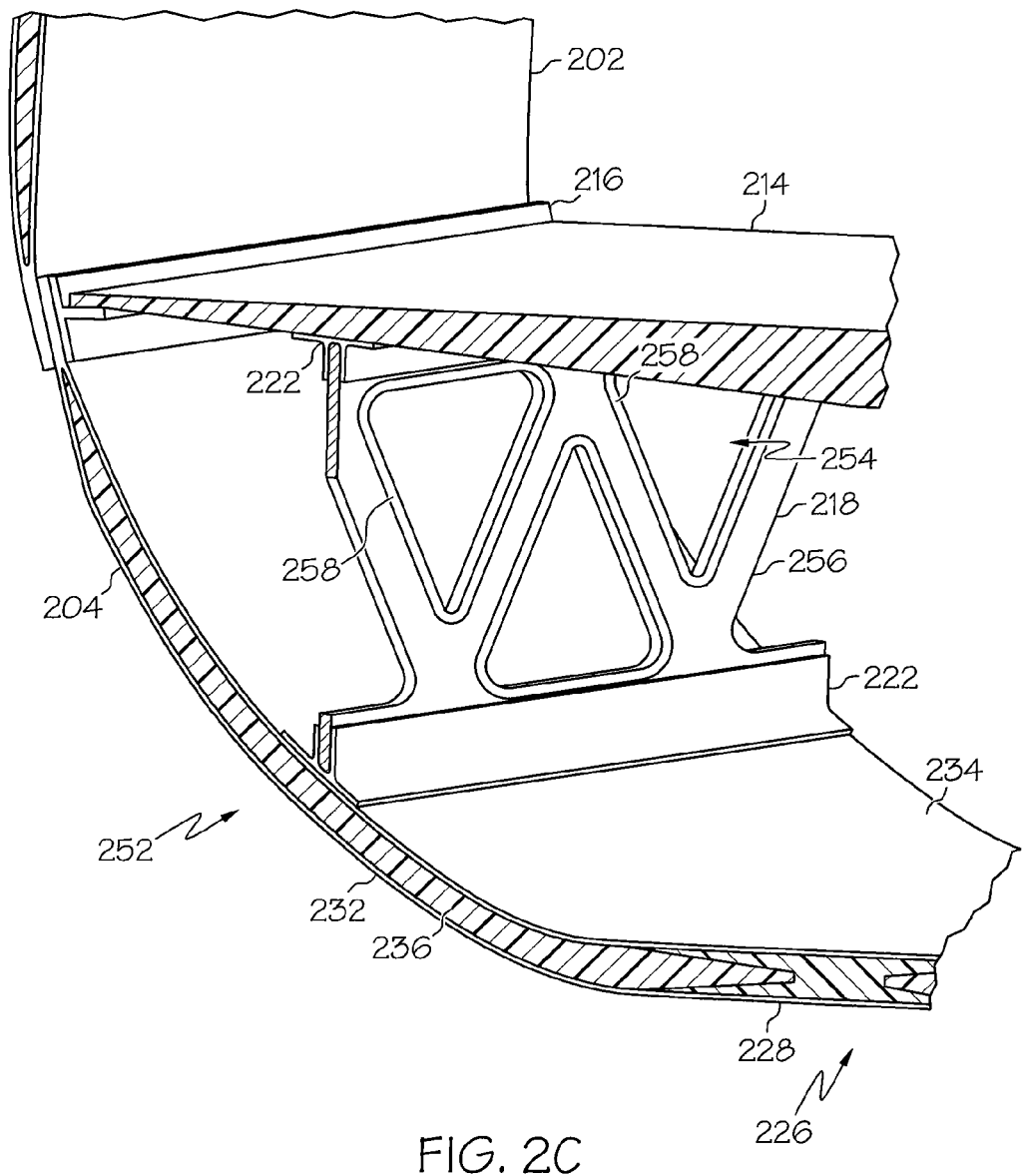
FIG. 2C is a perspective view of another optimized fuselage structure including an integrated stanchion formed to provide reduced weight and structural load path optimization in accordance with an embodiment of the present invention.

Referring also to FIG. 2C, FIG. 2C is a partial perspective view of another optimized fuselage structure 252. The optimized fuselage structure 252 is similar to the optimized fuselage structure 200 and includes an integrated stanchion modified to provide reduced weight and structural load path optimization in accordance with an embodiment of the present invention. A plurality of openings or cut-outs 254 may be formed or machined through the unitized stanchion 218 in predetermined shapes to provide a reduction in weight and to provide structural load path optimization to the fuselage structure 252. As illustrated in FIG. 2C, the stanchion 218 may be formed in a lattice framework 256 to provide optimum strength to weight. In other words, the stanchion 218 may be formed in a structure or framework with minimum weight to provide the strength to withstand the expected loads and stresses associated with operation of the aircraft or aerospace vehicle and to even withstand in excess of the expected loads and stresses by a predetermined factor. The unitized stanchions could also be optimized to better handle impact and crush loads required for safety. As previously discussed, the unitized stanchion may be a sandwich structure and may include an energy absorbing core and face sheets that can absorb energy and may be formed in a configuration to aid in better control of failure characteristics of the structure. Each of the cut-outs 254 may also include reinforcing material 258 around a perimeter of the cut-out 254. The reinforcing material may include laminate reinforcement, additional plies of composite material or other reinforcement.

Figure 2D:
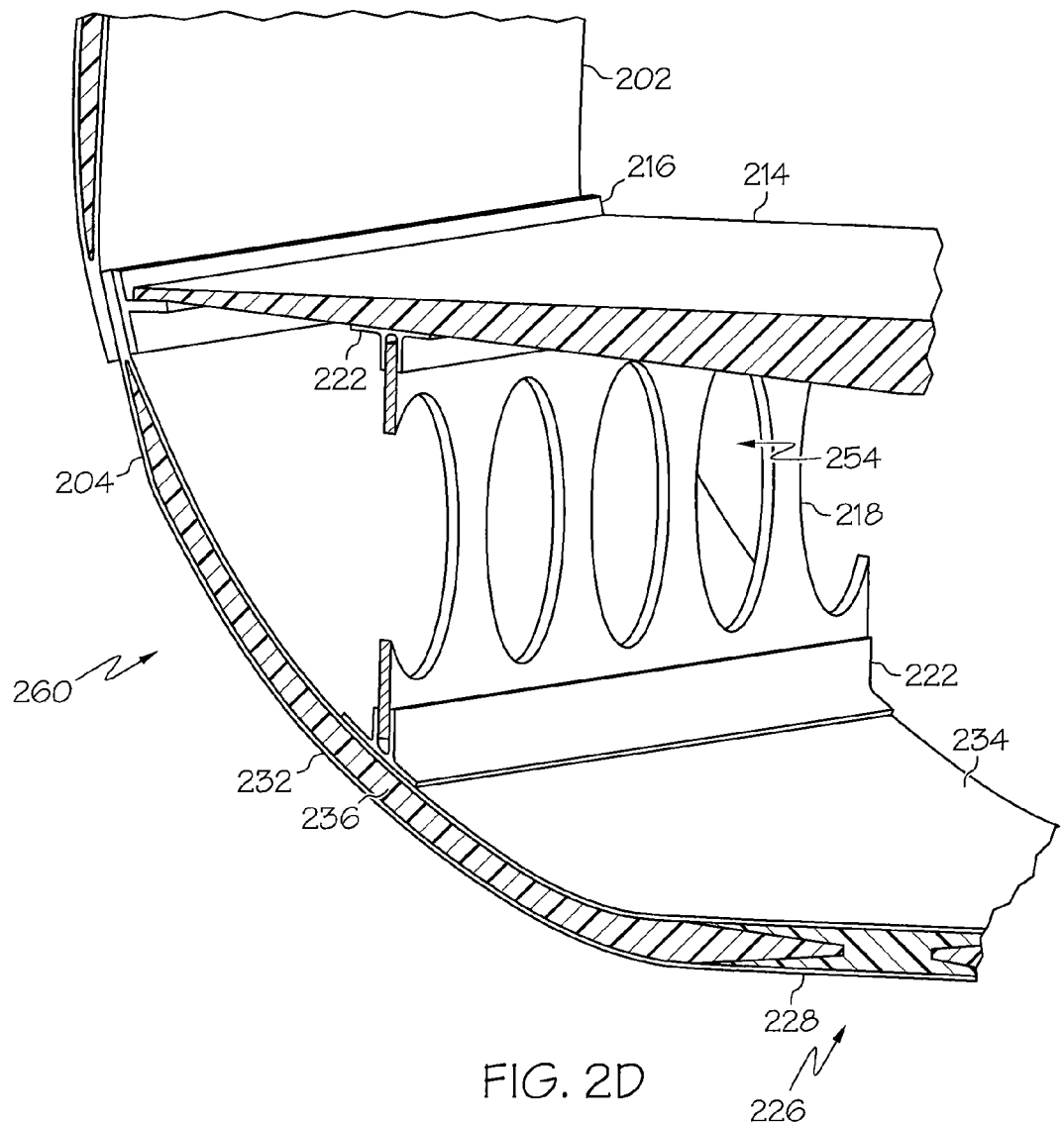
FIG. 2D is a perspective view of a further optimized fuselage structure including an integrated stanchion formed to provide reduced weight and structural load path optimization in accordance with a further embodiment of the present invention.

FIG. 2D is a partial perspective view of a further optimized fuselage structure 260 including an integrated stanchion 218 formed to provide reduced weight and structural load path optimization in accordance with a further embodiment of the present invention. In FIG. 2D, the predetermined shape of the cut-outs 254 may be formed in a substantially oval or elliptical-type shape. The cut-outs 254 may be sculpted or contoured in any shape to provide a substantially optimum strength to weight ratio.

Figure 3:
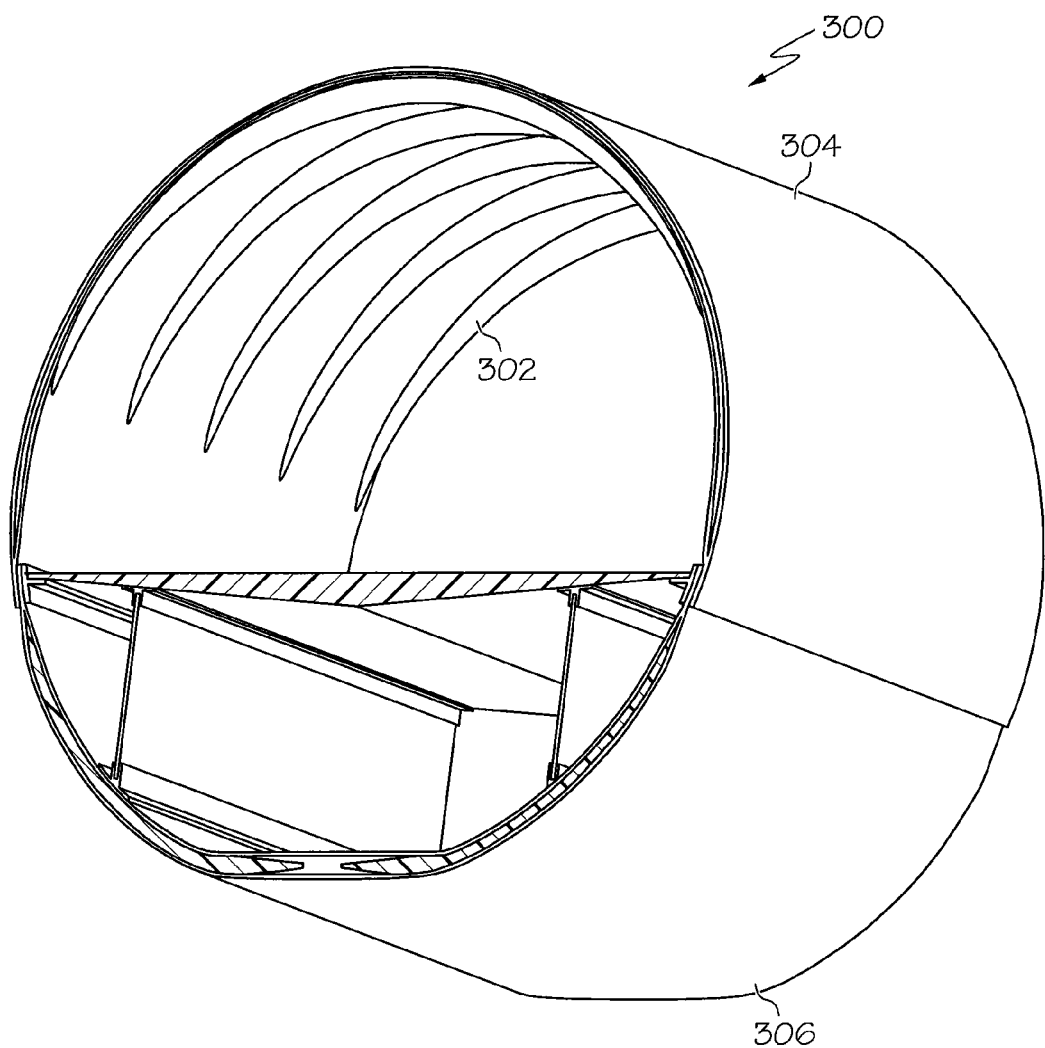
FIG. 3 is a perspective view of an optimized fuselage structure for an aerospace vehicle in accordance with another embodiment of the present invention.

FIG. 3 is a perspective view of an optimized fuselage structure 300 for an aerospace vehicle in accordance with another embodiment of the present invention. The fuselage structure 300 may include a frame structure or a plurality of frame members 302 formed in at least one of an upper fuselage portion 304 and a lower fuselage portion 306. Examples of frame members that may be used for frame members 302 will be described in more detail with reference to FIGS. 4, 5 and 6. Other than the plurality of frame members 302, the fuselage structure 300 may be similar to the fuselage structure 200 of FIG. 1. Accordingly, the fuselage structure 300 may include the same components as those described with respect to the fuselage structure 200.

Figure 4:
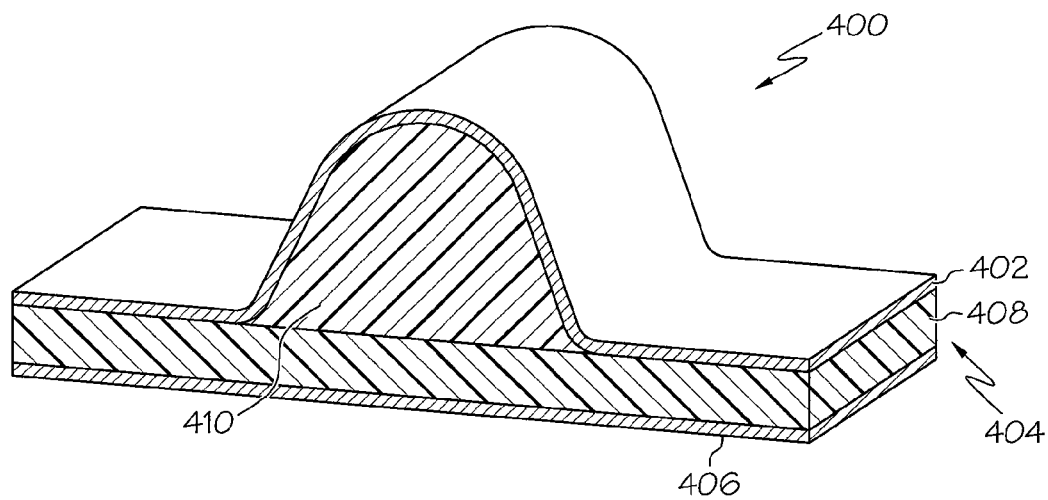
FIG. 4 is an example of a frame member that may be used with an optimized fuselage for an aerospace vehicle in accordance with an embodiment of the present invention.

FIG. 4 is an example of a frame member 400 that may be used with an optimized fuselage for an aerospace vehicle in accordance with an embodiment of the present invention. The frame member 400 may be used for each of the frame members 302 of FIG. 3. The frame member 400 may be integrated in an inner skin 402 or inner layer of material of a sandwich structure 404 of the upper fuselage portion 304 or lower fuselage portion 306 (FIG. 3). Similar to that previously described, the sandwich structure 404 may include an outer layer of material 406. The outer layer of material 406 may be a composite material or fabric, a metallic material or other suitable material. The outer layer 406 may include multiple plies of material or fabric. A core structure 408 may be disposed on the outer layer 406. The core structure 408 may be a honeycomb structure of composite material, a foam material, a metallic material or other lightweight, high strength material. A frame core 410 may be disposed on the core structure 408. The frame core 410 may be a foam, honeycomb type material, metallic material or similar material to provide structural integrity with minimal addition of weight. The inner skin 402 or inner layer of material may be formed on the frame core 410 and the core structure 408. The inner layer of material 402 may be composite material or fabric, metallic material or other suitable material. The inner layer 402 may also include multiple plies of material or fabric.

Figure 5:
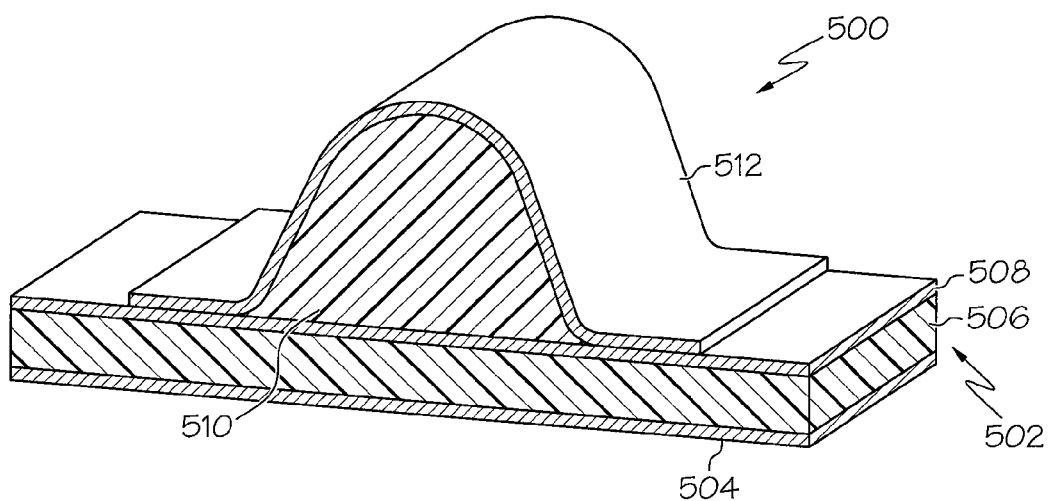
FIG. 5 is an example of another frame member that may be used with an optimized fuselage for an aerospace vehicle in accordance with another embodiment of the present invention.

FIG. 5 is an example of another frame member 500 that may be used with an optimized fuselage for an aerospace vehicle in accordance with another embodiment of the present invention. The frame member 500 may also be used for each of the frame members 302 of FIG. 3. The frame member 500 may be similar to the frame member 400 of FIG. 4. Accordingly, the frame member 500 may include a sandwich structure 502. The sandwich structure 502 may include an outer layer of material 504. The outer layer of material may be composite material or fabric, a metallic material or other suitable material. A core structure 506 may be disposed on the outer layer 504. The core structure 506 may be a honeycomb type structure of composite material or the like, a foam structure, a metallic structure or other material. An inner layer of material 508 may be formed on the core structure 506. The inner layer of material 508 may also be a composite material or fabric, a metallic material or other suitable material. A frame core 510 may be disposed on the inner layer 508. The frame core 510 may be a foam, honeycomb type structure, metallic structure or similar structure to provide structural integrity while adding minimal weight to the structure. A frame ply of material or multiple frame plies 512 may be formed over the frame core 510. The frame ply or plies 512 may be a composite material or fabric, metallic material or other suitable material. The frame ply or plies 512 may retain the frame core 510 in place and protect the frame core 510.

Figure 6:
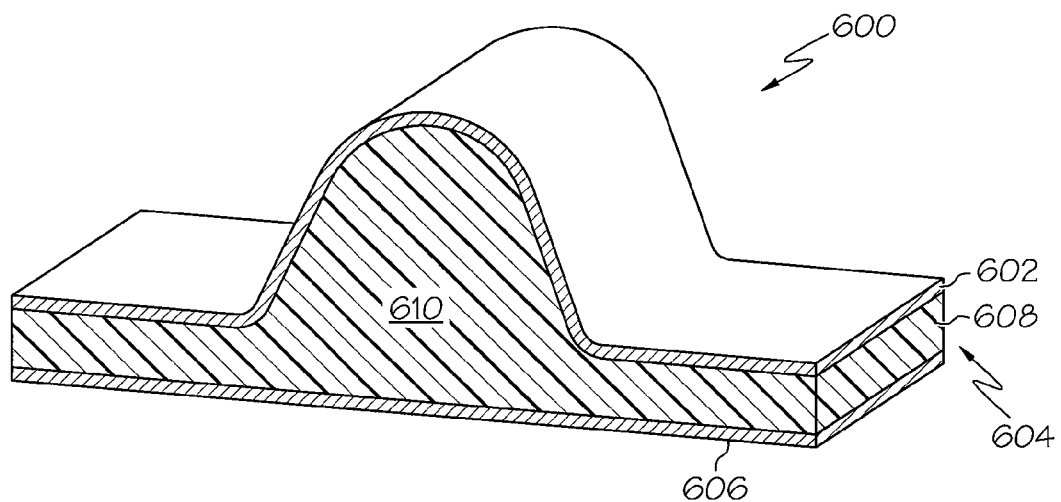
FIG. 6 is an example of a further frame member that may be used with an optimized fuselage for an aerospace vehicle in accordance with a further embodiment of the present invention.

FIG. 6 is an example of a further frame member 600 that may be used with an optimized fuselage for an aerospace vehicle in accordance with a further embodiment of the present invention. The frame member 600 may be used for each of the frame members 302 of FIG. 3. The frame member 600 may be integrated in an inner skin 602 or inner layer of material of a sandwich structure 604 of the upper fuselage portion 304 or lower fuselage portion 306 (FIG. 3). Similar to that previously described, the sandwich structure 604 may include an outer layer of material 606. The outer layer of material 606 may be a composite material or fabric, a metallic material or other suitable material. The outer layer 606 may include multiple plies of material or fabric. A core structure 608 may be disposed on the outer layer 606. The core structure 608 may be a honeycomb structure of composite material, a foam material, a metallic material or other lightweight, high strength material. A frame core 610 may be integrally formed as one piece with the core structure 608. The inner skin 602 or inner layer of material may be formed on the frame core 610 and the skin core structure 608. The inner layer of material 602 may be composite material or fabric, metallic material or other suitable material. The inner layer 602 may also include multiple plies of material or fabric.

Figure 7A:
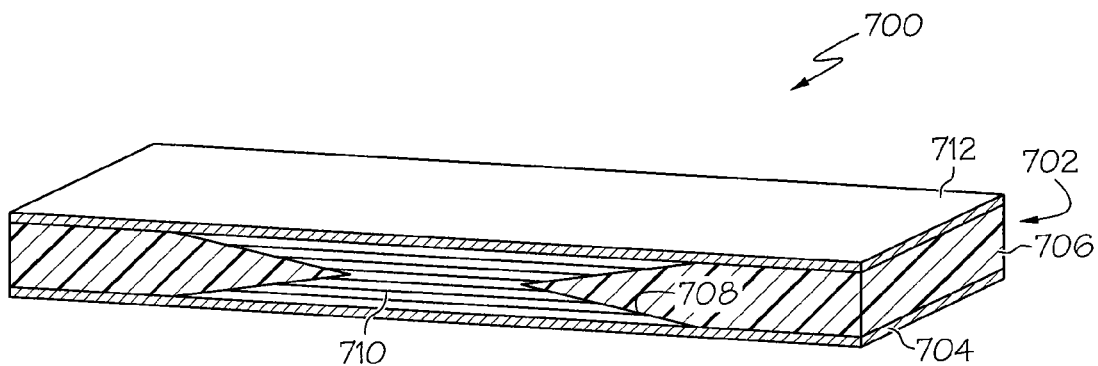
FIG. 7A is an example of an integrated keel beam that may be used with an optimized fuselage in accordance with an embodiment of the present invention.
Figure 7B:
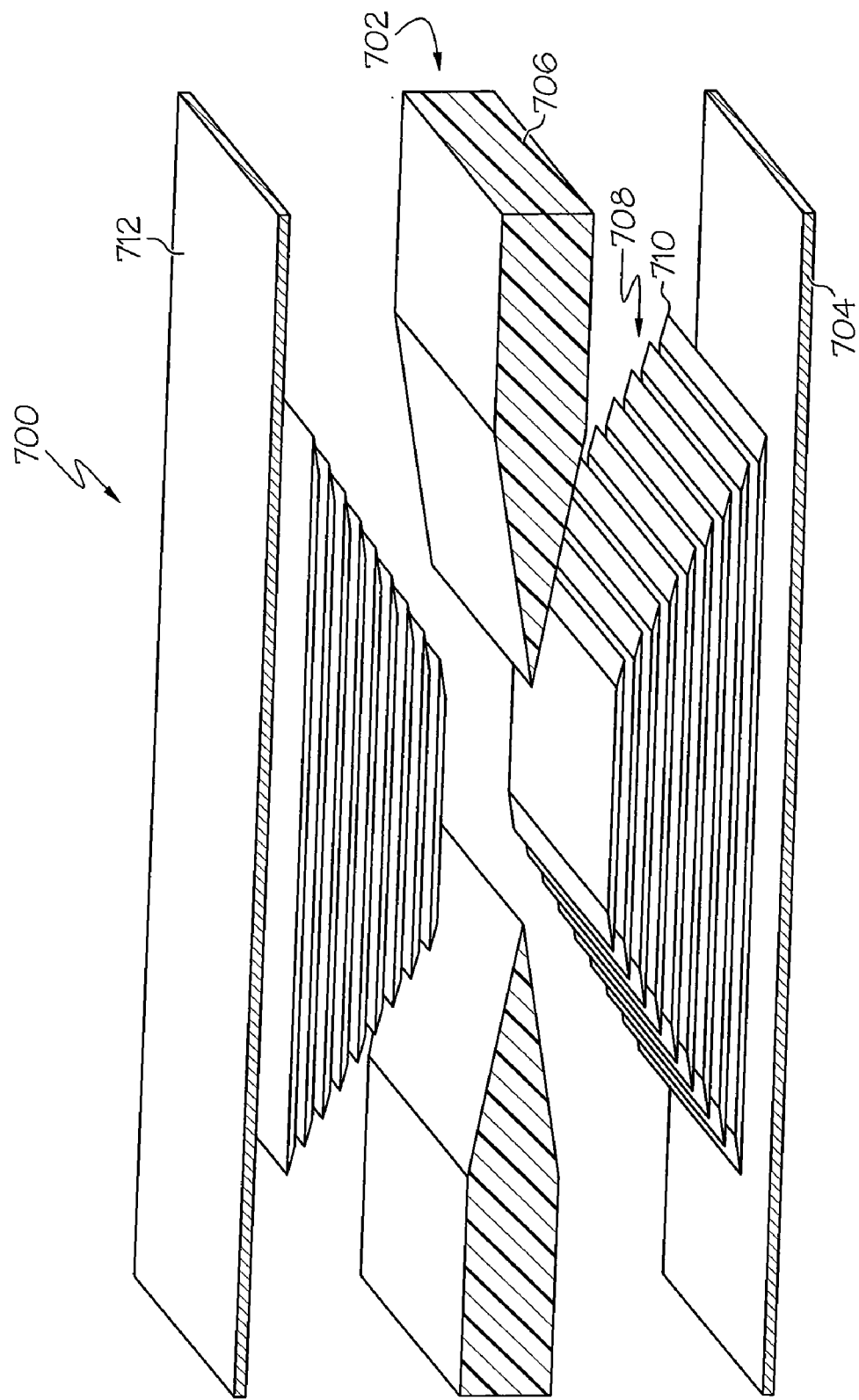
FIG. 7B is an exploded view of the integrated keel beam structure of FIG. 7A.

FIG. 7A is an example of an integrated keel beam structure 700 that may be used with an optimized fuselage in accordance with an embodiment of the present invention. Referring also to FIG. 7B, FIG. 7B is an exploded view of the integrated keel beam structure 700 of FIG. 7A illustrating the structural details of the keel beam 700. The integrate keel beam 700 may be used for the integrate keel beam structure 228 of FIG. 2. The integrated keel beam 700 may be formed in a sandwich structure 702 similar to that previously described. The integrate keel beam structure 700 may include an outer layer of material 704. The outer layer 704 may be a composite material, metallic material or other light weight, high strength material or fabric. The outer layer 704 may include multiple plies of material or fabric. A core structure 706 may be disposed on the outer layer 704. The core structure 706 may be a honeycomb type structure, foam structure, metallic core or similar assembly. The core structure 706 may be formed around a panelized structure 708 to define the keel beam. The panelized structure 708 may include multiple plies or layers of material 710 as best illustrated in FIG. 7B to form a laminate structure to react to loading. The multiple plies of material 710 may be a composite material, fabric or other suitable material. An inner layer of material 712 may be formed on the core structure 706. The inner layer 710 may also be a composite material, fabric, metallic material or other material and may include multiple plies of material or fabric.

Figure 8:
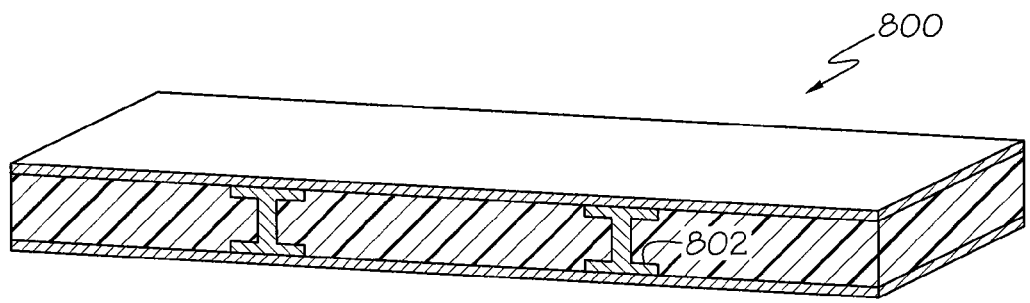
FIG. 8 is an example of another integrated keel beam that may be used with an optimized fuselage in accordance with another embodiment of the present invention.

FIG. 8 is an example of another integrated keel beam 800 that may be used with an optimized fuselage in accordance with another embodiment of the present invention. The integrate keel beam 800 may be used for the integrate keel beam 228 of FIG. 2. The integrated keel beam 800 may be similar to the keel beam 700 except the panelized structure 708 may be replaced with an I-beam structure or structures 802.

Figure 9:
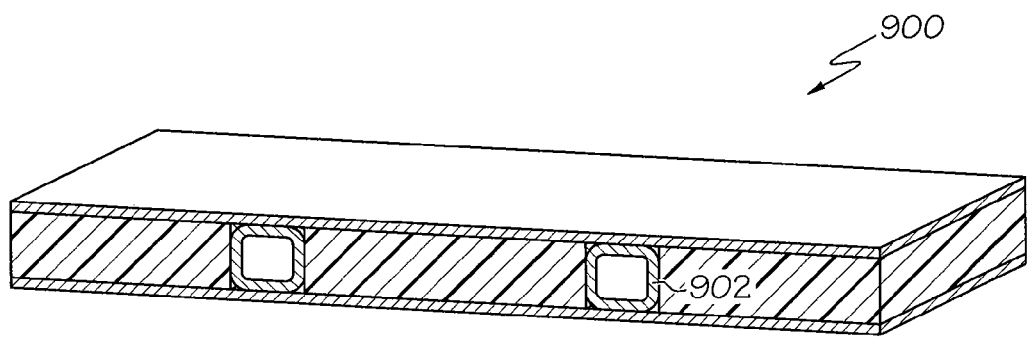
FIG. 9 is an example of a further integrated keel beam that may be used with an optimized fuselage in accordance with a further embodiment of the present invention.

FIG. 9 is an example of a further integrated keel beam 900 that may be used with an optimized fuselage in accordance with a further embodiment of the present invention. The integrate keel beam 900 may also be used for the integrate keel beam 228 of FIG. 2. The integrated keel beam 900 may be similar to the keel beam 700 and 800 except the panelized structure 708 or I-beam structures 802 may be replaced with a box beam structure or structures 902 or any suitable structure.

Figure 10:
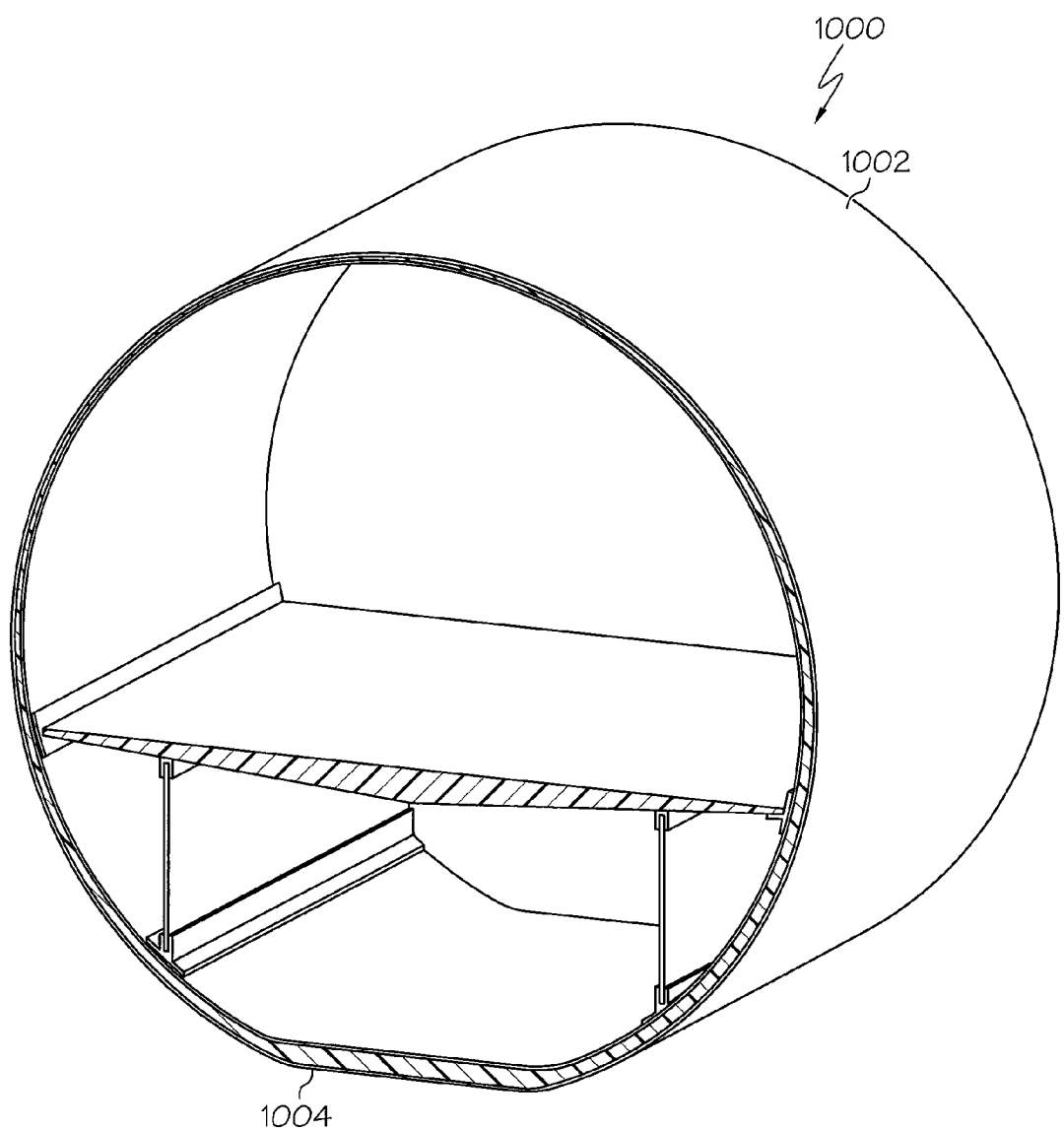
FIG. 10 is a perspective view of another optimized fuselage structure for an aerospace vehicle in accordance with a further embodiment of the present invention.

FIG. 10 is a perspective view of another optimized fuselage structure 1000 for an aerospace vehicle in accordance with a further embodiment of the present invention. The fuselage structure 1000 is similar to the structure 200 of FIG. 2 except the upper fuselage portion 1002 and the lower fuselage portion 1004 are integrally formed as one unitary fuselage piece.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A fuselage structure, comprising:
    an upper fuselage portion;
    a lower fuselage portion;
    a floor disposed between the upper fuselage portion and the lower fuselage portion; and
    a plurality of substantially parallel frame members integrally formed in fuselage structure, each frame member extending transverse to a longitudinal extent of fuselage and each frame member comprising a frame core and a layer of material formed over the frame core, wherein each substantially parallel frame member extends only partially down each side of the fuselage structure from a crown or upper most section of the upper fuselage portion.

2. The fuselage structure of claim 1, further comprising at least one unitized stanchion disposed between the floor and the lower fuselage portion, wherein the at least one unitized stanchion form the only structural support between the floor and the lower fuselage portion.

3. The fuselage structure of claim 2, wherein the at least one unitized stanchion comprises a composite sandwich structure.

4. The fuselage structure of claim 3, wherein the composite sandwich structure comprises:
    a first layer of material;
    a second layer of material;
    core structure disposed between the first and second layers of material.

5. The fuselage structure of claim 4, wherein the core structure comprises one of a group including a honeycomb type structure and a foam.

6. The fuselage structure of claim 2, further comprising:
    a first attachment structure attached to an underside of the floor to attach one end of the at least one unitized stanchion directly to the underside of the floor; and
    a second attachment structure attached to the lower fuselage portion to attach an opposite end of the at least one unitized stanchion directly to the lower fuselage portion.

7. The fuselage structure of claim 6, wherein the first attachment structure and the second attachment structure each comprise a longeron pi-type joint.

8. The fuselage structure of claim 7, wherein the longeron pi-type structure comprises a composite material or a metallic pi structure.

9. The fuselage structure of claim 2, wherein the at least one unitized stanchion is bonded directly to the floor and the lower fuselage portion by a pi clip attachment.

10. The fuselage structure of claim 2, wherein the at least one unitized stanchion comprises a structure to define a fire barrier.

11. The fuselage structure of claim 2, wherein the at least one stanchion forms a structural barrier to the fuselage structure.

12. The fuselage structure of claim 2, wherein the unitized stanchion comprises a plurality of cut-outs formed there through in predetermined shapes to provide a reduction in weight and to provide structural load path optimization to the fuselage structure.

13. The fuselage structure of claim 12, wherein each of the plurality of cut-outs comprises reinforcing material around a perimeter of the cut-out.

14. The fuselage structure of claim 12, wherein each of the plurality of cut-outs comprises additional plies of material around a perimeter of the cut-out for reinforcement.

15. The fuselage structure of claim 2, wherein the unitized stanchion is formed in a lattice framework to provide an optimum strength to weight structure.

16. The fuselage structure of claim 1, wherein each substantially parallel frame member tapers toward each end.

17. The fuselage structure of claim 1, wherein the upper fuselage portion comprises a sandwich structure, the sandwich structure comprising:
an outer layer of material;
a core structure disposed on the outer layer of material, wherein the frame core of each substantially parallel frame member is disposed on the core structure of the upper fuselage portion; and
an inner layer of material disposed over the core structure and the frame core of each substantially parallel frame member.

18. The fuselage structure of claim 1, wherein the upper fuselage portion comprises a sandwich structure, the sandwich structure comprising:
an outer layer of material;
a core structure disposed on the outer layer of material;
an inner layer of material disposed over the core structure, wherein the frame core of each substantially parallel frame member is disposed on the inner layer of material of the upper fuselage portion; and
a ply of material disposed over the frame core of each substantially parallel frame member and over the inner layer of material on each side of the frame core.

19. The fuselage structure of claim 1, further comprising a multiplicity of plies of material disposed over the frame core of each substantially parallel frame member and over the inner layer of material on each side of the frame core.

20. The fuselage structure of claim 1, wherein the upper fuselage portion comprises a sandwich structure, the sandwich structure comprising:
an outer layer of material;
a core structure disposed on the outer layer of material, wherein the frame core of each substantially parallel frame member is integrally formed as one piece with the core structure of the upper fuselage portion; and
an inner layer of material disposed over the core structure and the frame core of each substantially parallel frame member.

21. An aircraft, comprising:
a fuselage including:
an upper fuselage portion;
a lower fuselage portion;
a floor disposed between the upper fuselage portion and the lower fuselage portion; and
a plurality of substantially parallel frame members integrally formed in fuselage structure, each frame member extending transverse to a longitudinal extent of fuselage and each frame member comprising a frame core and a layer of material formed over the frame core, wherein each substantially parallel frame member extends only partially down each side of the fuselage structure from a crown or upper most section of the upper fuselage portion.

22. The aircraft of claim 21, further comprising at least one unitized stanchion disposed between the floor and the lower fuselage portion, wherein the at least one unitized stanchion form the only structural support between the floor and the lower fuselage portion and wherein the at least one unitized-each stanchion comprises a composite sandwich structure.

23. The aircraft of claim 22, further comprising:
a first attachment structure attached to an underside of the floor to attach one end of the at least one unitized stanchion directly to the underside of the floor; and
a second attachment structure attached to the lower fuselage portion to attach an opposite end of the at least one unitized stanchion directly to the lower fuselage portion.

24. The aircraft of claim 23, wherein the first and second attachment structure each comprise a longeron pi-type joint.

25. The aircraft of claim 23, wherein the at least one unitized stanchion comprises a plurality of cut-outs formed there through in predetermined shapes to define an optimum strength to weight framework.

26. A method for making a fuselage structure, comprising:
forming an upper fuselage portion;
forming a lower fuselage portion;
disposing a floor between the upper fuselage portion and the lower fuselage portion; and
integrally forming a plurality of substantially parallel frame members integrally formed in fuselage structure, each frame member extending transverse to a longitudinal extent of fuselage and each frame member comprising a frame core and a layer of material formed over the frame core, wherein each substantially parallel frame member extends only partially down each side of the fuselage structure from a crown or upper most section of the upper fuselage portion.

27. The method of claim 26, further comprising forming at least one unitized stanchion disposed between the floor and the lower fuselage portion, wherein, forming of the at least one unitized stanchion comprises:
forming a first layer of composite material;
forming a second layer of composite material; and
disposing a core structure between the first and second layers of composite material.

28. The method of claim 27, wherein forming at least one of the first layer of composite material and the second layer of composite material comprises forming multiple laminated plies of material.

29. The method of claim 27, further comprising attaching the unitized stanchion to the floor and the lower fuselage portion by bonding directly to the floor and to the lower fuselage portion by a longeron pi-type structure.

30. The method of claim 27, further comprising forming the at least one unitized stanchion to provide a cargo structural barrier and fire barrier.

31. The fuselage structure of claim 30, further comprising a multiplicity of plies of material disposed over the frame core of each substantially parallel frame member and over the inner layer of material on each side of the frame core.

* * * * *